G. W. Richardson.
Mower.
No. 45345　　　　　　　　　Patented Dec. 6. 1864.
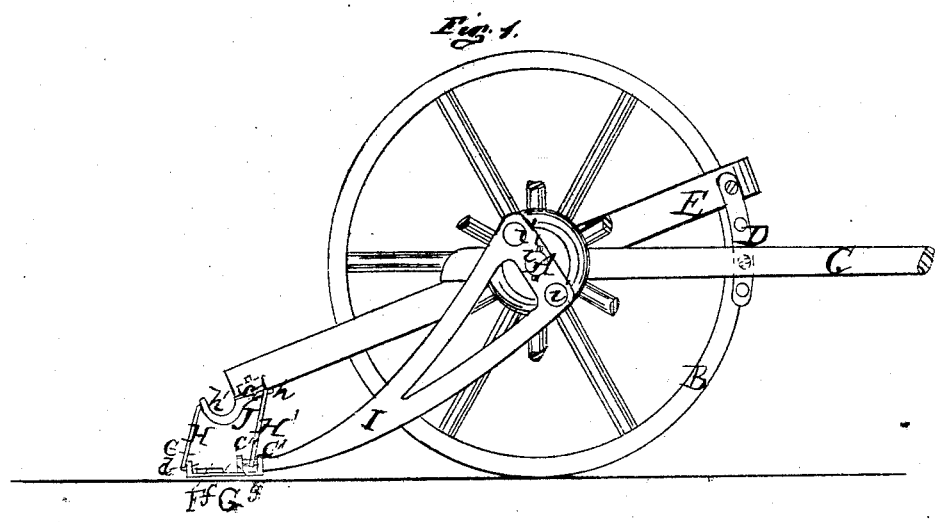
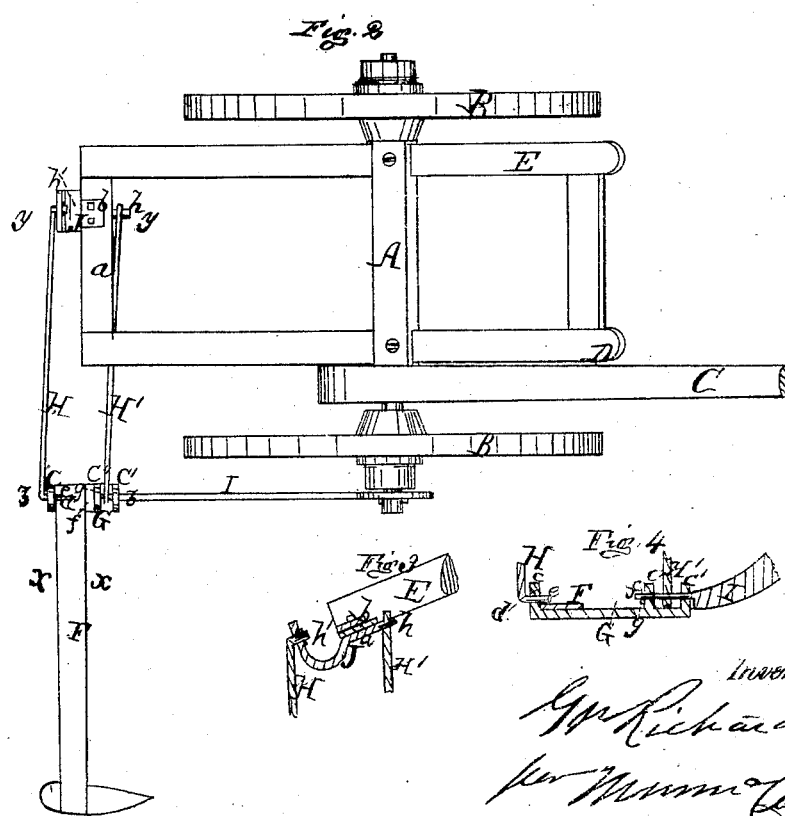
Witnesses
Theo Tusch
C. L. Topleff
Inventor
G. W. Richardson
per Munn & Co
Atty

UNITED STATES PATENT OFFICE.

G. W. RICHARDSON, OF GRAYVILLE, ILLINOIS.

IMPROVEMENT IN HARVESTERS.

Specification forming part of Letters Patent No. 45,345, dated December 6, 1864.

*To all whom it may concern:*

Be it known that I, G. W. RICHARDSON, of Grayville, in the county of White and State of Illinois, have invented a new and Improved Grain and Grass Harvester; and I do hereby declare that the following is a full, clear, and exact description thereof, which will enable others skilled in the art to make and use th same, reference being had to the accompanying drawings, forming part of this specification, in which—

Figure 1 is a side view of my invention, the finger-bar being in section, as indicated by the line $x\,x$, Fig. 2; Fig. 2, a plan or top view of the same; Fig. 3, a section of a portion of the same, taken in the line $y\,y$, Fig. 2; Fig. 4, a section of a portion of the same, taken in the line $z\,z$, Fig. 2.

Similar letters of reference indicate like parts.

This invention consists in a novel and improved manner of attaching the finger-bar to the main frame of the machine, as hereinafter fully shown and described, whereby it is believed several advantages are obtained over other machines in present use.

A represents an axle having a wheel, B, at each end of it, and C is the draft-pole attached to the axle and regulated in position by a segment-plate, D, which is attached to the draft-pole and main frame E by screws, said plate being provided with a series of holes, through any of which a screw passes into the draft-pole. The main frame E is of rectangular form, and it projects some distance behind the axle A, has an inclined position, and a metal cross-bar, $a$, at its rear end, to which the bearing $b$ of the crank-shaft which drives the sickle is attached.

F is the finger-bar, the inner end of which is provided with a shoe, G, the ends of which are curved or bent upward at right angles to the main portion to form lips $c\,c'$, a lip, $c''$, being attached to the shoe near its front end and parallel with the front lip, $c'$, as shown clearly in Figs. 1 and 4.

H H' are two brace-rods, one of which, H, is bent at one end to form a journal, $d$, at right angles to it, and this journal passes through the back lip, $c$, of the shoe, and is secured therein by a pin, $e$. The corresponding end of the other rod, H', is fitted on the journal $f$ of a draw-bar, I, which journal passes through the two lips $c'\,c''$, and is secured therein by a pin, $g$. The other ends of the brace-rods are fitted, one, H', on a journal, $h$, at the end of a plate, J, which is secured to the cross bar $a$ of the main frame E. The other rod, H, is bent to form a journal, $h'$, which passes through an upright lip on said plate, the journals $h\,h'$ being in line with the bearing $b$ of the crank-shaft. The draw-bar I has its front end fitted on one end of the axle A, and the front end of the draw-bar is provided with three holes, $i$, either of which may receive the end of the axle. By adjusting the front end of the draw-bar I in different holes $i$ the fingers of the bar F may be more or less elevated, as desired, and the fingers adjusted to suit the cutting of either grass or grain. By having the outer ends of the brace-rods H H' secured to the plate J in line with the crank-shaft the pitman and sickle will operate perfectly under the varying positions of the finger-bar and sickle, as the movement of the shoe G will be in the arc of a circle, the crank-shaft and journals $h\,h'$ being at the center of said circle.

The whole arrangement, though simple, is important. The machine is not subjected to any undue strain while in operation, while the sickle-bar is allowed to conform perfectly to the inequalities of surface over which it may pass.

I claim as new and desire to secure by Letters Patent—

The combination of the brace-rods H H' and draw-bar I, when attached or applied to the machine and to the shoe G, of the finger-bar F, to operate in the manner as and for the purpose herein set forth.

G. W. RICHARDSON.

Witnesses:
  W. H. GILBERT,
  WILOBY SOLOMON.